United States Patent [19]

Butler

[11] Patent Number: 4,643,168

[45] Date of Patent: Feb. 17, 1987

[54] LIQUID COOLED FIBER THERMAL RADIATION RECEIVER

[75] Inventor: Barry L. Butler, Del Mar, Calif.

[73] Assignee: The United States of America as represented by the United States Department of Energy, Washington, D.C.

[21] Appl. No.: 718,059

[22] Filed: Mar. 29, 1985

[51] Int. Cl.[4] ................................................ F24J 3/02
[52] U.S. Cl. ................................. 126/449; 126/432; 126/441; 165/104.19
[58] Field of Search ............... 126/400, 430, 441, 449, 126/900, 428, 429, 432; 165/104.19

[56] References Cited

U.S. PATENT DOCUMENTS

| | | | |
|---|---|---|---|
| 3,875,925 | 4/1975 | Johnston | 126/449 X |
| 4,129,117 | 12/1978 | Harvey | 126/449 X |
| 4,138,990 | 2/1979 | Hussmann | 126/450 |
| 4,186,721 | 2/1980 | Whitman | 126/430 |
| 4,257,396 | 3/1981 | Reinert | 126/449 X |
| 4,304,223 | 12/1981 | Novinger | 126/449 X |
| 4,306,542 | 12/1981 | Reinert | 126/449 X |
| 4,324,231 | 4/1982 | Reinert | 126/449 |
| 4,326,504 | 4/1982 | Guadard et al. | 126/449 |
| 4,396,007 | 8/1983 | Siemiller | 124/444 |
| 4,458,747 | 7/1984 | Berry et al. | 165/104.19 X |

FOREIGN PATENT DOCUMENTS 2719958 11/1978 Fed. Rep. of Germany ...... 126/449

Primary Examiner—Margaret A. Focarino
Attorney, Agent, or Firm—Kenneth L. Richardson; John M. Albrecht; Judson R. Hightower

[57] ABSTRACT

A radiation-to-thermal receiver apparatus for collecting radiation and converting it to thermal energy is disclosed. The invention includes a fibrous mat material which captures radiation striking the receiver. Captured radiation is removed from the fibrous mat material by a transparent fluid within which the material is bathed.

9 Claims, 3 Drawing Figures

LIQUID COOLED FIBER THERMAL RADIATION RECEIVER

CONTRACTUAL ORIGIN OF THE INVENTION

The U.S. Government has rights in this invention pursuant to Contract No. DE-AC02-83CH10093 between the U.S. Department of Energy and the Solar Energy Research Institute, A Division of the Midwest Research Institute.

BACKGROUND OF THE INVENTION

1. Field of the Invention

The present invention relates to a receiver apparatus for collecting concentrated solar radiation.

2. Description of the Prior Art

In conventional thermal receiver systems concentrated solar energy is captured by an appropriate fluid and transformed into thermal or heat energy in a receiver apparatus. The fluid is subsequently collected and used to drive thermal devices, e.g., steam generators and the like. Fluids employed in conventional receiver apparatuses must have heat transfer and thermal storage properties to match those of solar energy systems.

Molten salts employed as fluids to capture thermal energy have been utilized effectively in solar energy systems. A salt, as used in this invention, is any of a class of compounds that are formed by the replacement of one or more hydrogen atoms of an acid with elements or groups and that usually ionize in a solution. Molten salts are known to be thermally stable, modestly-corrosive, to have high energy transfer densities, and possess thermal properties in the operating temperature range of conventional solar energy systems, i.e., between 100°–1200° C.

Molten salts are also non-reactive when exposed to air, thereby dispensing with the need to design, operate, and maintain air-tight, leak-proof systems. Additionally, salts have low vapor-pressures which minimize costs associated with high pressure containment systems. Finally, salts are inexpensive and readily available in abundant quantities.

There are numerous salts and salt mixtures which comply with the above requirements and are therefore used in solar energy applications. The salts which are known to have the greatest utility are nitrates, carbonates, chlorides, sulfates, and bromides of the alkali metals and alkaline earths. However, there are other salts known in the art which are useful in solar energy systems, such as those disclosed by Mar and Carling in their article entitled "The Application of Molten Salts to Solar Large Power Systems" published in 1980.

In typical closed system receivers, molten salt is pumped through a tube, the outside of which is irradiated by solar energy. As the tube becomes hotter than the salt, the latter cools the tube; thus, energy is drawn away from the tube. It has been demonstrated that if energy is imparted directly into the salt, receiver efficiency can be improved by as much as 10%. The principles of direct absorption prompt the salt to flow through the concentrated solar flux where the energy is absorbed directly into the blackened salt.

Molten salts used in the state-of-the-art direct absorption receivers are typically blackened by the addition of carbon black or another black particle agent. The application of agents to salts is desireable because it is well known by those skilled in the art that a darker surface captures or absorbs a greater amount of thermal energy than a lighter surface. The thermal energy is absorbed by the particle agent subsequently heating up the molten salt. Due to the overall particle surface area in contact with the salt, thermal energy is transferred to the salt. Moreover, this arrangement allows solar energy to be absorbed by particles deep within the salt.

In solar receivers, the proper amount of agent must be uniformly and continually mixed with the salt. Often it is difficult to achieve a uniform mixture, i.e., a mixture in which the agent is suspended in the salt solution because the solution, tends to separate from the agent due to buoyancy forces and gravity. When the agent is non-uniformly mixed throughout the fluid, the ability of the receiver to capture thermal radiation is seriously limited because the salt becomes too clear and solar radiation passes through without being absorbed. These mixture limitations additionally restrict the operation of direct absorption molten salt receivers, which causes substantial maintenance and other costs.

Another consideration affecting homogeneous agent and salt solution mixture is the flow orientation of the fluid. Typical state-of-the-art direct absorption receivers are designed so that the salt mixes in a relatively turbulent manner. To this end, the temperature at the outer surface of the flowing salt substantially equals the bulk temperature of the salt. When the outer surface temperature is comparable or equal to that of the bulk of the receiver's fluid, it is highly possible for an excessively high amount of thermal energy to escape to the outside environment by means of convection. In salt cooled tube receivers the temperature of the surface of the tube has been known to be 50° C. hotter than the temperature of the bulk salt, which dramatically increases the possibility of receiver heat losses. Under these conditions, the ability to control losses is limited and the output efficiency of the receiver is diminished.

SUMMARY OF THE INVENTION

It is the primary object of the present invention to provide a new and improved radiation absorbing thermal receiver apparatus with enhanced temperature control and output efficiency.

It is another object of the present invention to provide a new and improved radiation absorbing thermal receiver apparatus having a maximum temperature located within its interior thereby lowering convection losses from outside surfaces when compared with state-of-the-art direct and indirect absorption receivers.

A further object of the present invention is to provide a new and improved radiation absorbing thermal receiver apparatus which utilizes fibrous mat material and transparent molten salt for collecting thermal energy.

An additional object of the present invention is to provide a new and improved radiation absorbing thermal receiver apparatus incorporating an array of closely spaced, small-diameter, blackened fibers of predetermined configuration and density.

It is still another object of the present invention to provide a new and improved radiation absorbing thermal receiver apparatus adapted to operate within a predetermined temperature range of 100°–1200° C.

It is still a further object of the present invention to provide a new and improved radiation absorbing thermal receiver apparatus for collecting concentrated solar radiation and having an operating capacity of at least 10 sun solar flux intensity.

It is still an additional object of the present invention to provide a new and improved radiation absorbing thermal receiver apparatus employing low-cost corrosion resistant fibers as thermal absorbers.

Yet another object of the present invention is to provide a new and improved radiation absorbing thermal receiver apparatus adapted to operate under thermal shock conditions owing to changes in solar flux.

To achieve the foregoing and other objects and in accordance with the purposes of the present invention, as embodied and broadly described herein, the apparatus to which the inventive concept is applied to comprises an elongate receiver having inlet and outlet means between which a transparent fluid is circulated. Thermal energy striking the front surface of the receiver is gathered by a fibrous mat material having an orientation which defines or governs the extent of solar absorption of the receiver. In other words, the fibrous mat has a configuration specifically adapted to govern the extent of thermal energy absorbed by the receiver as a function of depth within the mat.

Thermal energy gathered by the material is collected by the transparent fluid because of the latter's physical properties. The fibrous mat accordingly cools as thermal energy is drawn away by the fluid. Means for transferring the thermal energy to the output of the receiver through outlet means is provided.

The direction of the circulating fluid is preferably parallel to the thermal or solar energy striking the receiver and perpendicular to its elongate orientation. As the fluid travels in the same direction as the solar beam disposed within the fiber array, the beam is progressively absorbed by the fibers, and heat is transferred to the fluid. Due to its size, shape, design, heat transfer properties, and fluid flow rate, the receiver operates within a predetermined temperature range.

Additional objects, advantages, and novel features of the invention shall be set forth in part in the description that follows and will become apparent to those skilled in the art upon examination of the following description or may be learned by the practice of the invention. The objects and advantages of the invention may be realized and attained by means of the instrumentalities and in combinations particularly pointed out in the appended claims.

BRIEF DESCRIPTION OF THE DRAWINGS

The accompanying drawings, which are incorporated in and form a part of the specification, illustrate the preferred embodiment and together with the description serve to explain the principles of the invention.

In the drawings.

DETAILED DESCRIPTION OF THE PREFERRED EMBODIMENTS

Figure 1:
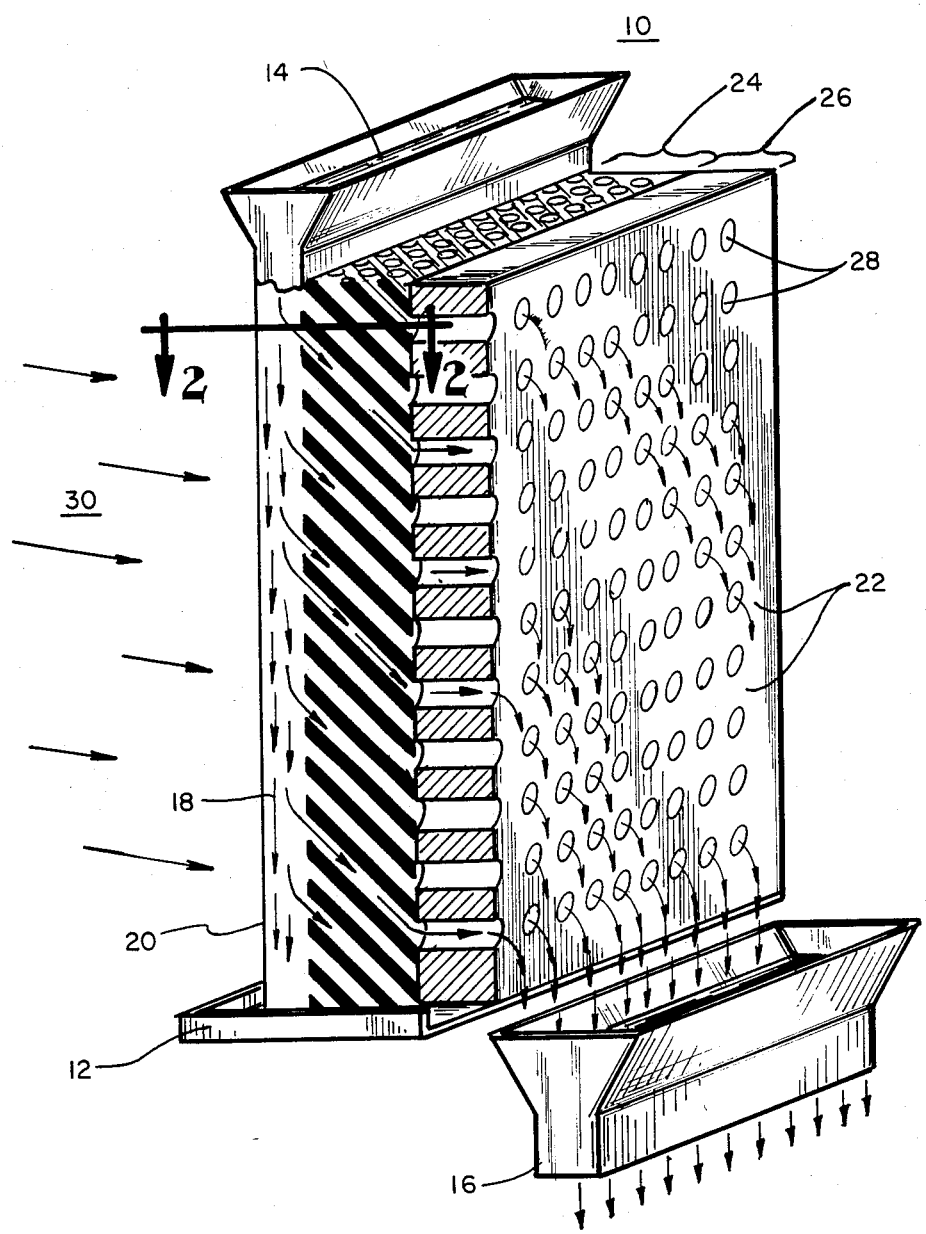
FIG. 1 is a perspective elevational view of a preferred receiver in accordance with the present invention.

With reference now to the drawings, a thermal receiver 10 having a substantially elongate orientation is shown and is seen to have a generally rectangular cross-section as best illustrated in FIG. 1. It will be understood, however, that this invention is applicable to receivers with alternate cross-sectional orientations.

FIG. 1 illustrates an embodiment of the receiver held in place by support stand 12 having a substantially similar orientation as the lower portion of receiver 10, i.e., essentially a rectangular orientation. FIG. 1 further illustrates inlet and outlet means or ports 14 and 16 respectively between which transparent fluid 18 is circulated. Outlet port 16 is connected to suitable auxiliary devices, not shown. Because of the generally rectangular configuration of receiver 10, front and back sides 20 and 22 respectively provide the surfaces over which fluid 18 flows which will be discussed in greater detail below. The front side 20 of the present invention consists of the fluid and the fibrous mat also to be described in greater detail hereinbelow.

Figure 2:
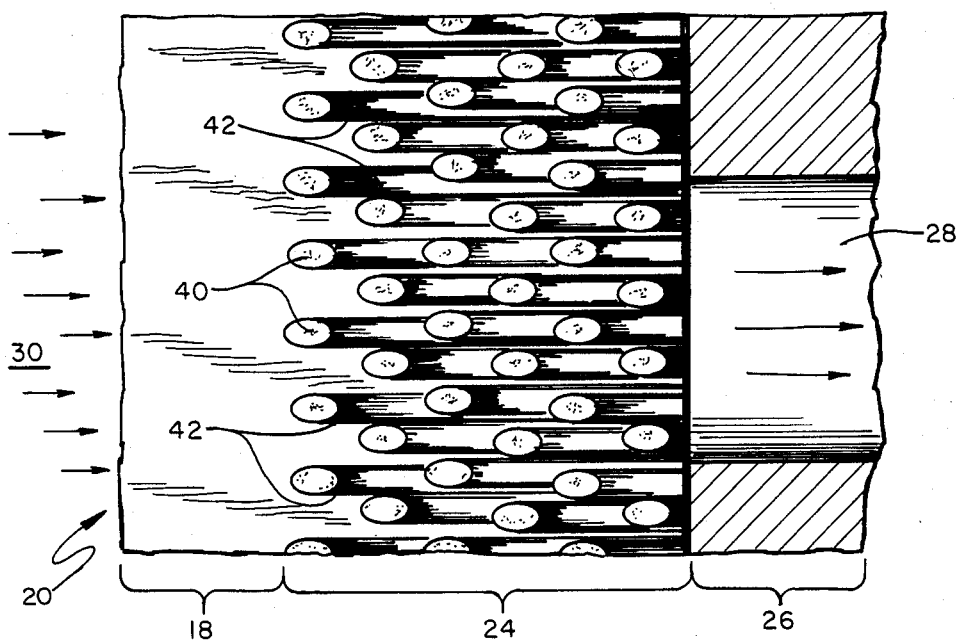
FIG. 2 is a view taken along line 2—2 in FIG. 1 illustrating the orientation of the fibrous mat.

As best illustrated in FIGS. 1 and 2, receiver 10 consists of fibrous mat material 24 of elongate orientation including an array of individual fibers 40 oriented in a predetermined configuration and spaced adjacent to the flow orientation of fluid 18. In the preferred receiver, fluid 18 falls under the force of gravity commencing at inlet port 14 and continuing through mat 24 along the angle in which the fibers are slanted. As a consequence, fibers 40 are bathed in fluid 18 throughout the duration of receiver operation.

As noted in FIG. 1, a support plate 26 also of substantially rectangular configuration is positioned next to fibrous mat 24. Support plate 26 has a plurality of bores 28 oriented perpendicularly with respect to the elongate orientation of receiver 10 and spaced apart from each other. The most significant function of plate 26 is to provide a means for transferring fluid 18 from one side of fibrous mat 24 to outlet port 16. If differential pressure is used to drive the fluid through the fibrous mat plate 26 is moreso needed to securely support the mat. Therefore, plate 26 preferably consists of a material which has excellent high temperature properties and which can withstand pressure differentials and the weight of receiver 10. Materials known to have these properties are ceramics, metals, and the like.

As can be observed in FIGS. 1 and 2, solar or other radiant energy 30 shines on, impinges, or otherwise strikes fibrous mat 24. Due to this behavior fluid 18 absorbs a portion of the solar energy. However, the principal portion of the energy is absorbed by fibers 40 disposed within mat 24. As the sun's rays penetrate the front of mat 24, surface fibers shadow adjacent and deeper fibers. Shadows 42 illustrate how inner fibers receive less light. Therefore, as thermal energy strikes fibers 40, a portion of the energy is absorbed almost immediately. That energy is subsequently transferred into the interior of receiver 10 on account of the heat transfer properties of fibers 40. Consequently, due to the orientation of the fibers, the amount of solar energy gathered by receiver 10 can be controlled with reasonable certainty. In this regard, the number of fibers per unit volume and their diameters define or govern the absorption of thermal energy at any given depth within receiver 10.

On the one hand, the greater the density of fibers in the mat, the closer to the front surface of the fiber mat the energy will be absorbed. On the other hand, a fibrous mat having fewer fibers will absorb solar radiation over a longer depth. By way of illustration and not by limitation, the fibers of the present invention are preferably black or blackened by an agent such as carbon, which is known to facilitate the absorption of thermal energy. Moreover, it has even been established that gray fibers can be used in these applications.

In accordance with the teachings of the present invention, a variety of fibers can be used to achieve the presently desired heat transfer objectives. For example, an array having fibers constructed of glass or metal whose diameters range between 7 and 500 microns is known to have excellent absorbing properties. Additionally, woven cloth, felted fiber, or a filament wound type material is known to have useful heat transfer properties.

As best shown in FIGS. 1 and 2, fibers 40 are closely-spaced and have a predetermined configuration and density. In fact, the density of the fibers facilitates the absorption of thermal energy by the fluid. However, the fibers are not so close to one another that the fluid is in any way restricted from flowing between the fibers.

Again, by way of example and not by limitation, the comparative size of the mat, best illustrated in FIG. 1, accounts for 5%–20% of the volume of the interior of the fibrous mat portion of receiver 10. However, it is certainly within the scope of this invention to substitute mats of alternate sizes, shapes, and volumes.

As was mentioned above the fibrous mat is continuously bathed in fluid 18 as the latter circulates throughout the receiver. Under these circumstances it is desirable that the fluid have properties which lend themselves to long-term use and application. To foster optimum operation of receiver 10 the transparent fluid is preferably a molten carbonate salt which is known to have high temperature stability and low vapor pressure. However, the present receiver is not limited in any respect to carbonate salts; others, such as nitrates, and the like, fall within the scope of the present invention. The only limitations on the use of salts is that they should not be overly corrosive or solidify in the operating range of the receiver, i.e., 100°–1200° C.

As referenced above, fluid 18 has optical and thermal properties which accommodate the collection of thermal energy derived from fibrous mat 24. Simultaneously however, thermal energy is removed from fibers 40 and as the latter cools down the temperature of the fluid is increased proportionately. Therefore, thermal energy which would otherwise travel back to the outside of receiver 10 through the inlet or the front surface is blocked because of the fluid's heat storage, transfer properties, and flow direction. To this end, the interior of receiver 10 has the highest temperature rather than the front surface of this device. This phenomenon reduces both convection and radiation losses which otherwise occur in conventional and direct surface flow receivers. This effect is known to impart a 5% reduction in surface thermal losses. In this connection, control of the temperature within receiver 10 is enhanced. Consequently, an overall increase in efficiency of about 5% is achieved over typical state-of-the-art receivers.

Figure 3:
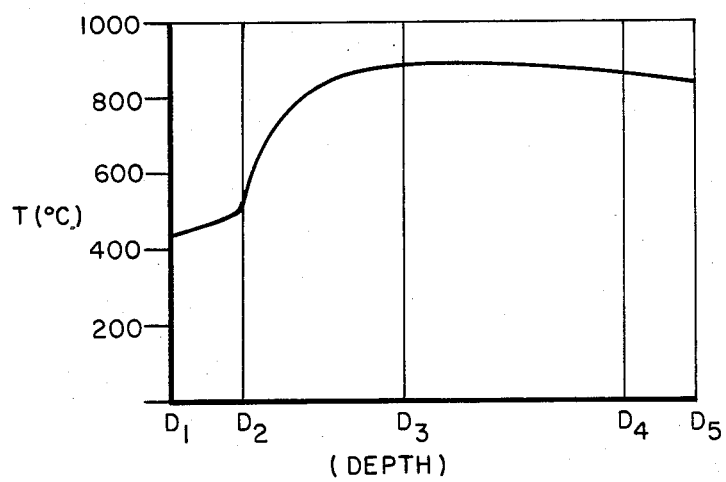
FIG. 3 is a graph of the temperature distribution versus depth into the interior of the receiver illustrated in FIG. 1.

FIG. 3, in conjunction with FIG. 1, illustrates the distribution of temperature within receiver 10 during its operation. The sections created by the vertical lines on the graph correspond to distinct components within receiver 10. The first, second, third, and fourth sections of the graph represent the fluid, the fibrous mat, the support plate, and the fluid again, respectively. As illustrated in FIG. 3, before the receiver is exposed to thermal energy, its temperature is substantially equal to the ambient temperature of its environment. At some later time, after exposure of 200 sun irradiation and 2 mm/minute salt flow rates, the temperature is shown to have risen to approximately 500° C. $D_1$ corresponds to the position of the outer surface of fluid 18 some time after receiver 10 is exposed to thermal energy. Additionally, position $D_1$ corresponds to the lowest temperature of fluid 18. At position $D_2$, illustrating the interface between fluid 18 and fibrous mat 24, the temperature is shown to be approximately 500° C. The temperature at $D_2$ has exceeded that at location $D_1$ due to the sharing of thermal energy within fluid 18.

The greatest temperature increase in receiver 10 is shown between $D_2$ and $D_3$, i.e., between the interface and support plate 26. In this region, thermal energy is radiated in all directions, but most is absorbed by neighboring fibers and little is lost from the front surface. As this action occurs, the temperature of the fluid increases because of each fiber's ability to absorb and transfer its solar derived thermal energy. Additionally, as fluid 18 is constantly drawing thermal energy away from each fiber 40, and as the fluid is flowing toward position $D_3$, the rise in temperature in this area of the receiver will be substantial. As observed, the temperature of the receiver at location $D_3$ is greater than 900° C.

As noted, the temperature within support plate 26, i.e., between $D_3$ and $D_4$, remains substantially constant. An important consideration which contributes to constant temperature within this segment of the receiver is the material from which the support plate is fabricated. Here, the temperature of the majority of the fluid in this segment is substantially uniform in that there are no fibers from which the fluid can gain additional thermal energy and no shine through solar energy to support plate 26. Because of this, the temperature of fluid 18 entering bores 28 at the far end of the fibrous mat 24 that is closest to the input is effectively the same as the temperature of fluid 18 exiting the bores.

The temperature of fluid 18 after it has exited receiver 10 through bores 28 is represented by the graph of the region between $D_4$ and $D_5$. As depicted, the temperature of the fluid decreases or dips only slightly. This slight dip on the graph occurs because fluid 18 is exposed to the temperature of the air inside the receiver thus energy is lost or dissipated. Consequently, the temperature at position $D_5$, about 900° C., reflects the temperature of fluid 18 which flows into outlet port 16. While a preferred configuration is disclosed in which the fluid is allowed to fall freely while exposed to inside and outside temperatures, modifications are within the scope of the present invention such as an arrangement where the fluid is totally encased in a glass or a transparent structure.

As was mentioned above, the orientation of fibers 40 in fibrous mat 24 facilitates the absorption of thermal energy by receiver 10. In the preferred embodiment, the individual fibers are arranged in fibrous mat 24 so as to slope toward outlet port 16. In response to the reaction of the forces of differential pressure and gravity, fluid 18 trickles between the individual fibers as it flows down the front of mat 24. As fluid 18 continues to trickle between the fibers 40, thermal energy is removed therefrom. When the fluid reaches the back side of mat 24, it runs into bores 28 which deliver it to outlet port 16.

While a preferred embodiment of the invention has been described and illustrated, it will be clear that various modifications and changes are possible. The use of alternative salts and fibers has already been described. Likewise, the applicability of the invention to other structures having differing configurations has been mentioned. A fibrous mat in which individual fibers are slanted downward is disclosed in order to provide a preferred route for the fluid under the force of gravity. It will be clear, however, that other means for circulating or transferring the fluid from the input to the output, e.g., differential pressure and so forth may be employed.

From the foregoing disclosure of a preferred embodiment of the invention, it will be apparent that the invention lends itself to numerous modifications, changes, substitutions, and equivalents, all of which will be obvious to those skilled in the art. Accordingly, it is intended that the extent of the invention be limited only by the spirit and scope of the appended claims.

What is claimed is:

1. A radiation-absorbing thermal receiver apparatus comprising:
   fluid inlet and outlet means;
   a fibrous mat for capturing incident solar energy striking said receiver, said mat including an array of fibers in which said fibers are oriented together to extend longitudinally in a direction away from and non-parallel to the surface receiving said incident solar energy;
   a fluid engulfing said fibrous mat for collecting thermal energy from said fibrous mat, said fluid being adapted to cool said fibrous mat as thermal energy is removed therefrom; and
   fluid flow directing means for directing said fluid from said inlet means through said fibrous mat toward said outlet means in a direction generally parallel to the longitudinal orientation of said fibers and away from the solar energy incident on said receiver.

2. A radiation-absorbing receiver apparatus comprising:
   an array of elongated fibers for capturing incident solar radiation striking a side of said receiver, the fibers in said array being oriented to extend generally away from the incident solar radiation;
   a fluid flowing through said array of fibers in a direction substantially parallel to the orientation of said fibers and away from the incident solar radiation for collecting thermal energy from said fibers, the direction of said fluid flow being a function of the orientation of said fibers in said array;
   inlet and outlet means for conducting said fluid into and out of said receiver apparatus, said array of fibers being positioned between said inlet and said outlet means; and
   support means positioned adjacent said array of fibers on the side of said array opposite the incident solar radiation and adapted for transferring fluid from said fibers to said outlet means.

3. A radiation-absorbing thermal receiver apparatus in accordance with claim 2, wherein said small-diameter fibers are blackened.

4. A radiation-absorbing thermal receiver apparatus in accordance with claim 2, wherein said fibers in said array are oriented generally parallel with the incident solar radiation.

5. A radiation-absorbing thermal receiver apparatus in accordance with claim 2, wherein said fluid is a transparent molten salt having a low vapor pressure.

6. A radiation-absorbing thermal receiver apparatus in accordance with claim 2, wherein said support means comprises a plate member having a plurality of apertures aligned to direct said fluid from said fibers to said outlet means.

7. A radiation-absorbing thermal receiver apparatus in accordance with claim 2, wherein the side of said receiver adapted to receive impinging solar radiation. includes a front surface member substantially transparent to solar radiation and impermeable to fluids, and wherein said support means comprises a rigid, porous rear surface member that is permiable to fluids, said front and rear surfaces defining an interior chamber adapted to contain said array of fibers.

8. A radiation-absorbing receiver apparatus comprising:
   an array of elongated, small-diameter fibers for capturing incident solar radiation striking a side of said receiver, the fibers in said array being oriented to extend generally away from the incident solar radiation;
   a fluid flowing through said array of fibers in a direction parallel to the orientation of said fibers and away from the incident solar radiation for collecting thermal energy from said fibers, the direction of said fluid flow being a function of the orientation of said fibers in said array;
   inlet and outlet means for conducting said fluid into and out of said receiver apparatus, said array of fibers being positioned between said inlet and said outlet means; and
   a perforated support plate positioned against said array of fibers on the side of said array opposite the incident solar radiation.

9. A solar energy absorbing thermal receiver apparatus of rectangular elongate orientation maintained by a support stand and having inlet and outlet ports on opposite ends thereof, said receiver including a support plate having a plurality of bores for transmitting thermal energy, said receiver adapted to operate within a temperature range of 100°–1200° C. and at a 10 sun or greater solar energy intensity;
   said thermal receiver comprising:
   an array of blackened, closely-spaced, small-diameter fibers for capturing incident solar radiation striking a side of said receiver, said array having an orientation adapted to govern the absorption of solar energy by said receiver, said array having a predetermined configuration and density;
   a transparent molten salt for collecting incident solar radiation captured by said fibers, the collecting action adapted to cool said fibers as solar energy is removed, said molten salt having a low vapor pressure; and
   means for transferring said solar energy disposed within said salt to said outlet port, the direction thereof being through said array of fibers and said bores disposed within said support plate to said outlet port.

* * * * *